Feb. 19, 1957 H. WHITESELL 2,781,669
WHEELS
Filed Sept. 2, 1952 2 Sheets-Sheet 1

Inventor:
Harry Whitesell,

Feb. 19, 1957 H. WHITESELL 2,781,669
WHEELS
Filed Sept. 2, 1952 2 Sheets-Sheet 2
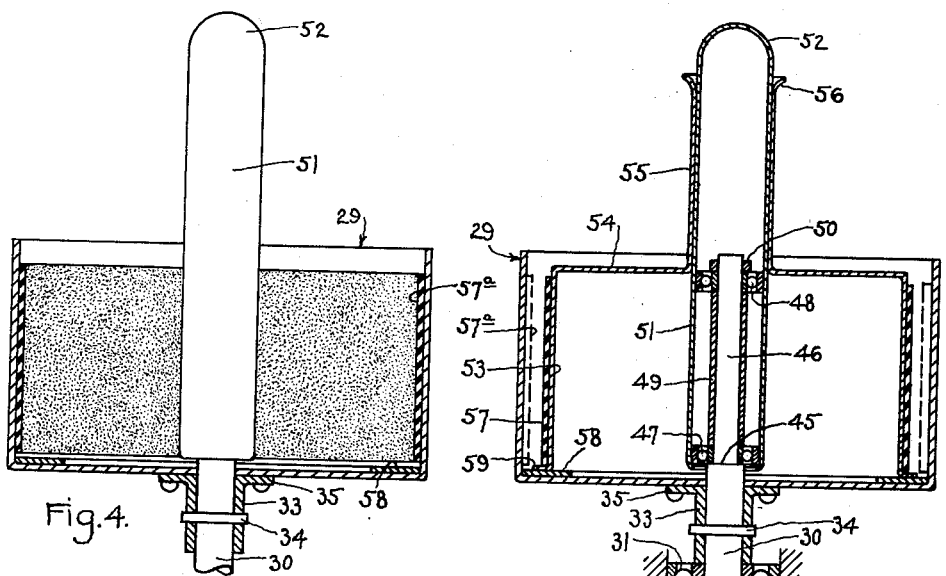
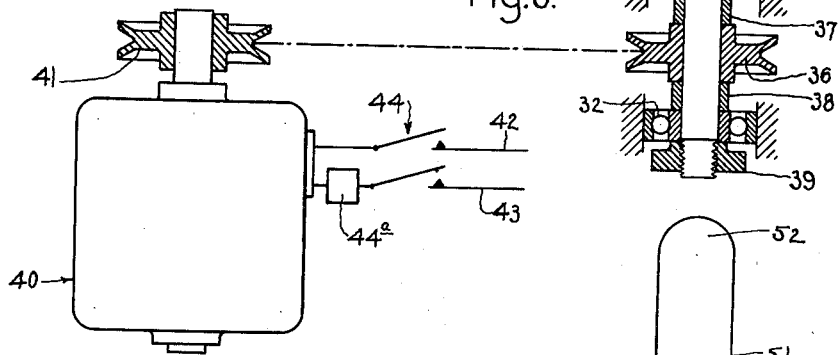
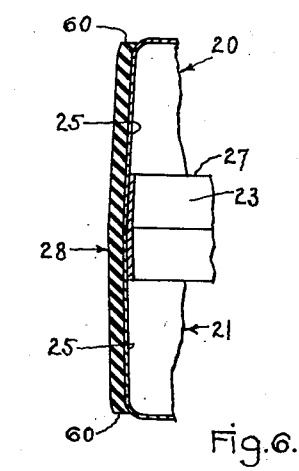
Inventor:
Harry Whitesell,
by [signature]
Atty.

United States Patent Office 2,781,669
Patented Feb. 19, 1957

2,781,669

WHEELS

Harry Whitesell, Chicago, Ill.

Application September 2, 1952, Serial No. 307,431

4 Claims. (Cl. 74—230.3)

This invention relates to improvements in wheels. The wheels herein disclosed have been designed primarily for use in connection with the driving and/or support of tapes or belts which carry abrasive materials and are used for grinding and/or polishing operations. However, it will presently appear that these wheels and wheels embodying the present disclosures, may be used for many other operations than that just stated. Therefore I do not intend to limit myself, except as I may do so in the claims to follow.

The wheel construction herein disclosed is or may be provided with a rubber or plastic material peripheral surface, so that the tape or belt runs in engagement with such surface. One feature and object of the present invention relates to the method or the operations whereby this rubber or plastic surface is provided on the wheel periphery, and the means which I have devised for carrying such method into use.

One principal object of the present invention is to produce a wheel of light but very stiff and rigid construction, so that it will continue to run with great trueness even at high rotational and peripheral speeds, and under expected loads or belt tensions. In this connection it is an object to design the wheel primarily of sheet metal and of form such that the sheet metal blanks used may be of simple design and readily produced by conventional sheet metal operations. In this connection it is a further object to so design the wheel that only two principal formed sheet metal sections are needed to form the complete wheel when said sections are set together; and to provide for rigid and secure centering of said sections as well as strong junction between them when said sections are assembled onto and locked to the hub element. A further and more detailed object in this connection is to also make provision for accurately registering and retaining in such registered condition, the peripheral portions of the wheel sections after the sections have been brought and locked together by the hub element. By this means there is assurance that the peripheral surfaces of the wheel sections will be retained in accurate registry during the running of the wheel, even at high speeds, and under severe belt tensions.

It is a further object of the invention to produce a wheel design such that the two principal sections thereof may be locked together onto the hub element, by simple sheet metal rolling or like operations, and without need of welding the parts together. Thus the costs of manufacture will be materially reduced without sacrifice of strength and accuracy of the wheels.

In connection with the production of the rubber or like surface on the peripheral portion of the wheel, it is an object of the invention to make provision for setting and cementing a rubber or rubber like band onto the wheel's peripheral surface, effecting such operation and result by first stretching such band from a size slightly smaller than that of the surface onto which it is to be seated, to a size slightly larger than such receiving surface, and thereafter permitting the band to sink or retract onto the wheel surface of larger size than the original size of such band. Thus the band is set into place under a natural stress due to stretch, of amount controllable by the operation itself. This natural stress may be developed in an amount to largely if not completely balance the expected centrifugal stress which will be developed during normal running of the wheel in its after service. Thus, the centrifugal force developed during normal running in service will not materially deform the rubber like surface from its true circular form, and a more true and accurate running thereof will occur, even at high speeds. Likewise, by developing the desired stress in the band of rubber like material as a normal condition thereof, I largely or completely eliminate tendencies for the said band to develop radial centrifugal forces against the cementing agent by which the band is cemented to the peripheral surface of the wheel.

A further object of the invention is to provide a series of operations, or a method by which the rubber like band may be effectively cemented to the peripheral surface of the wheel, taking account of the conditions under which this result must be produced when the said band is stretched prior to allowing it to sink or retract onto the wheel peripheral surface under stress.

Other objects and uses of the invention will appear from a detailed description of the same, which consists in the features of construction and combinations of parts, hereinafter described and claimed.

Figure 3 shows schematically a vertical section through a simple form of apparatus for centrifugally expanding the band of rubber like material to be set onto the peripheral surface of the wheel, this figure also showing schematically the means to drive the centrifugal apparatus aforementioned; and in this figure the band of rubber like material is shown set onto the original band carrier by full lines, and prior to expansion of said band centrifugally, and this figure also shows, by dotted lines, the centrifugally expanded form of such band, the band in such centrifugally expanded form lying against the inside surface of the rapidly rotating drum or cup;

Figure 4 shows a portion of the device of Figure 3, with the band of rubber like material expanded and held against the inside surface of the drum by high centrifugal force developed by the rapidly rotating drum; and in this figure the original band carrier by which such band was originally set into place in the drum, has been lifted out of and away from the drum, leaving the band in its centrifugally held expanded condition against the interior drum surface preparatory to setting the wheel itself into place in the drum;

Figure 5 shows a view similar to that of Figure 4, but with the wheel set down onto the spindle and within the body of the drum, and into contact with the frictional surface or annulus carried by the drum floor, so as to bring said wheel up to the rotational speed of the drum; and in this figure the driving force is still being exerted on the drum so that the rotational speed of the drum and of the band is still high enough to retain said band in its centrifugally expanded condition and thus still separated from the peripheral surface of the wheel; and at a later time the driving force will be discontinued to allow the motor and the drum to slow down, thus also slowing down the wheel and the band, to a point such that said band will be allowed to naturally contract onto the peripheral surface of the wheel, after which the parts will come to rest so that the wheel, carrying the set band may be removed from the drum; and Figure 6 shows a fragmentary section through the peripheral portion of the drum, with the band set into contracted position thereon, said band being edge trimmed as a final operation, and to give finish to the wheel surface.

Figure 1:
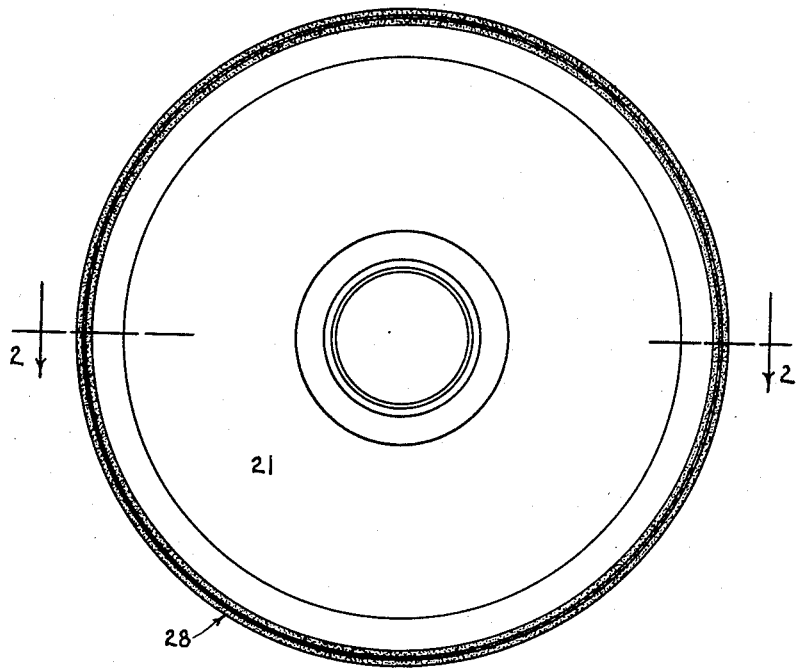
Figure 1 shows a face view of a wheel embodying the features of the present invention, the wheel therein shown being illustrated in substantially one-half scale.
Figure 2:
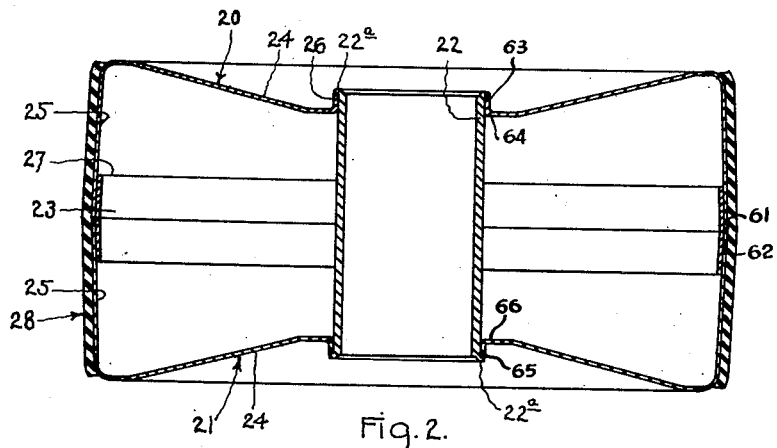
Figure 2 shows a cross-section taken substantially on the line 2—2 of Figure 1, looking in the direction of the arrows.

Referring first to Figures 1 and 2, the wheel therein disclosed includes two identical formed elements of sheet metal, 20 and 21, the cylindrical hub 22, and the interior reinforcing and supporting annulus 23. Each of the elements 20 and 21 is of sheet metal, formed to provide the slightly dished conical body flange 24, the slightly semi-crowned peripheral portion 25, and the hub neck portion 26. These elements 20 and 21 are set face to face, with their outer edges 61 and 62 respectively, in contact with each other, so that their semi-crowned peripheral portions 25 provide the desired amount of wheel crown (shown as substantially 2 degrees inwardly at each side of the line of contact between the two edges 61 and 62 of the elements, 20 and 21). The hub element 22 is of length to just receive both of the neck portions 26 as shown in Figure 2. Each of the neck portions 26 has an axially outer end 63 and axially inner end 64 in the case of the element 20, and 65 and 66 in the case of the element 21. The ends of the hub element are then formed slightly radially outwardly and then inwardly against the axially removed ends of these neck portions as shown at 22ª in Figure 2, thus locking both of the elements 20 and 21 onto the hub element, and with the outer edges of said two elements 20 and 21 in firm and even contact with each other. It thus appears that each semi-diameter of the body element of the wheel is of generally Z-shaped radial cross-section.

Prior to locking the two elements onto the hub element, and prior to assembly of the two elements 20 and 21 together, an annulus 27 is set into place against the interior proximate edge portions of the two elements 20 and 21. This annulus is of size to just set into the said proximate edge portions, where the peripheral portions of the elements 20 and 21 are of maximum size; and preferably, also said annulus itself is also formed with a slight crown to correspond to the crowning of the two elements 20 and 21. Thus, when the said elements 20 and 21 are brought together said annulus will just come into firm and even engagement with both of the interior peripheral surfaces at the time the edges of the two elements 20 and 21 come together. Said annulus will therefore serve to firmly reinforce the proximate edge portions of the two wheel sections 20 and 21, retaining said edge portions in perfect registry at all times, and ensuring against distortion of one or the other of said edge portions under forces developed during wheel running, and due to belt tensions exerted against the wheel surface. If desired, both of the edges may be welded together and to the annulus, with subsequent grinding of the so-welded portions in order to produce a perfect finish of the outer metal surfaces of the assembled wheel after the welding operation has been completed.

With the wheel completed to the condition above explained, a suitable surfacing of rubber like or plastic material, 28, may be formed or produced or set onto the crowned portion of the wheel. Such coating or layer may be of suitable thickness, as for example, substantially ⅛ to ³⁄₁₆ inch thick. When this coating comprises rubber-like material a convenient and desirable method of setting and securing the same in place on the wheel periphery comprises stretching a band of the material, which band is naturally of slightly less diameter than the wheel diameter, to a size slightly greater than the wheel size, and which band is of proper width to cover the desired width of the wheel periphery, setting said so-stretched band over the wheel, and allowing it to then contract into position on the wheel periphery. However, due to the size of such band, being of the order of 6 to 14 or 16 inches diameter, and its width and thickness, it is not feasible to follow the simple operation above outlined. Accordingly, I have made special provision for securing the placement and cementing of the band onto the wheel's peripheral surface, which procedure I shall now explain in detail, as follows:

Referring to Figures 3, 4 and 5, I have provided a circular cup-shaped holder 29 carried by the upper end of a shaft 30 which is journalled in the bearings 31 and 32. Conveniently this cup is secured to said shaft by the flange element 33 set onto and secured to the shaft by the cross-pin 34, the flange 35 of this element 33 being riveted or otherwise secured to the floor of the holder 29. This shaft 30 carries the drive wheel 36 between the bearings 31 and 32, such wheel being shown as comprising a V-grooved wheel of which the groove is adapted to receive a V-belt of conventional form. The sleeves 37 and 38 are set onto the shaft between the inner raceways of the bearings 31 and 32 and the hub of the wheel 36, and a nut 39 is threaded onto the end of the shaft and serves to draw the sleeves securely against the wheel hub, the cross-pin 34 serving to retain the element 33 in place and acting as a stop against the clamping action of said nut 39. Thus the wheel 36 is drivingly secured to the shaft. A driving motor 40 carrying the V-grooved wheel 41 having the V-groove which receives the V-belt above referred to. Thus, through such belt the shaft 30 and the holder 29 are rotated at speed determined by the motor. Current is supplied to the motor by the leads 42 and 43, under control of the switch 44, and a suitable speed control rheostat 44ª or other speed control element may also be provided for controlling the motor speed, and thus the speed of the holder.

The shaft 30 is extended up through the center of the holder 29, being of reduced diameter at the location of the upwardly facing shoulder 45, such reduced size portion of the shaft being numbered as 46. The two bearings 47 and 48 are set onto such shaft portion 46. A sleeve 49 is set between the inner raceways of the bearings 47 and 48, the inner raceway of the lower bearing 47 setting against the shoulder 45, and a nut 50 threaded onto the upper end of the shaft serving to press the inner raceway of the upper bearing 48 against the sleeve 49. Thus the two bearings 47 and 48 are securely held in position on the shaft extension 46.

A sleeve 51 is set onto the outer raceways of the bearings 47 and 48, being of size to permit such sleeve to extend down close to the floor of the holder, and to extend up a considerable distance above the holder. The lower end of this sleeve 51 is rounded beneath the lower bearing raceway so as to prevent said sleeve from removal upwardly from the bearings 47 and 48. Conveniently the upper end 52 of this sleeve is closed, as shown in Figure 3. With the foregoing arrangement it is possible for the operator to grasp the sleeve above the holder retaining such sleeve against rotation, the holder itself continuing to rotate at full speed.

There is provided a cylindrical band holder 53 of size slightly smaller than the peripheral portion of the wheel of Figures 1 and 2 (or other wheel onto which the band is to be set and cemented). This band holder is of axial dimension slightly greater than the axial dimension of the wheel of Figures 1 and 2. The upper portion of said holder 53 is carried inwardly as shown at 54, and a neck portion 55 extends upwardly from said portion 54, and serves as a convenient handle by which the band holder may be manipulated. This neck portion 55 sets down over the sleeve 51, on which it may be freely moved up and down; and the neck portion and said sleeve 51 may freely rotate with respect to each other. Conveniently the upper end 56 of said neck 55 is slightly flanged outwardly to facilitate grasping the neck and to facilitate shift thereof upwardly and downwardly on the sleeve 51. Upon occasion the band holder, including the neck portion 55 may be completely removed from the sleeve 51 and from the holder 29. The sleeve 51 is of size to nicely receive the hub 22 of the wheel of Figures 1 and 2, so that said wheel may be set down onto said sleeve 51.

The band 57 of rubber like material is of size to set easily onto the band holder 53, but is of smaller size than the peripheral portion of the wheel of Figures 1 and 2. Said band is also of width corresponding to the width of wheel which is to be surfaced. The band holder, with the band 57 set thereon is set down over the sleeve 51. The floor of the holder 29 is provided with the annulus 58 of such material as brake lining, and the lower edge of the band holder 53 is preferably slightly flanged outwardly as shown at 59 to provide an annular surface which may ride on said annulus 58. With the holder 29 rotating at high speed when the band holder is set down over the sleeve 51 the band holder 53 will quickly be brought up to the speed of the holder 29, thus also subjecting the band 57 to the centrifugal force developed by such rotational speed. By causing the holder 29 to rotate at sufficiently high rotational speed the centrifugal force developed in the band 57 will cause said band to expand outwardly away from the band holder and against the inner surface of the holder 29, as shown by the dotted lines 57ª in Figure 3. Having brought the elements to the condition just above explained, and with the holder 29 continued at the high rotational speed above referred to, the band holder 53, including the sleeve 55 may now be drawn up and away from the sleeve 51, leaving the band 57 retained in contact with the inner surface of the holder 29 by centrifugal force.

It is here to be noted that during the movement of the band 57 from the band holder to the position 57ª said band is completely free of restraints and therefore will come to a condition free of internal stresses, that is, it will be "normalized." Accordingly, as said band remains against the inner surface of the holder 29 it will be in a condition free of uneven stretches or distortions.

Having removed the band holder the parts will now be in the condition shown in Figure 4, it being understood that the holder 29 is continued in its high rotational speed. The wheel of Figures 1 and 2 may now be set down onto the sleeve 51, as shown in Figure 5, moving freely through the centrifugally expanded band 57, said band being shown in its centrifugal position in Figure 5. Then, by discontinuing supply of current to the motor 40, or reducing said current sufficiently, the holder 29 may be allowed to slow down at such rate of deceleration as may be desired. It will be understood that when the wheel was set down onto the floor of the holder 29 it was quickly brought to the speed of the holder 29, due to frictional engagement of the wheel with said floor. Accordingly, each surface area of the peripheral portion of the wheel will retain its position opposite to a corresponding segment of the inner surface of the band 57. This condition will continue to exist during the slowing down of the holder 29 and the wheel, so that as soon as the holder and wheel speed has fallen to a rate at which the centrifugal force developed on the band 57 is insufficient to retain said band in its expanded condition, said band will contract against the wheel peripheral surface, setting down onto the crown of the wheel in even and natural manner.

It is now seen how I have made provision for expanding the band 57, bringing the wheel into correct position within said expanded band, and then allowing the band to naturally contract against the wheel surface without presence of internal stresses of an uneven quality.

It is desired to provide for cementing the band onto the wheel surface. I shall now disclose how this cementing action may be produced, as follows:

At the outset it is noted that the band of rubber like material or of plastic material must be adhered to the wheel surface by a suitable cementing agent, taking account of the nature of the material from which the band is made. Furthermore, in any case the cementing materials used are of rather quick drying or setting qualities.

The wheel surface should first be well cleaned and provided with a "shiny" surface. This may well be done by a sand-blasting or like operation. Promptly thereafter there is applied to such prepared surface a coating of material dissolved in a volatile mother liquor. After this coating has dried by vaporization of the mother liquor a rubber cement will be applied to the so-coated and dried surface. If the band 57 is one of natural rubber such cement may be latex; if said band is one made of synthetic rubber, such cement may be a synthetic cementing agent. Such cementing agent is then allowed to dry. It is here noted that the Ty-Ply comprises a binder between the metal surface and such cementing agent. The inside surface of the band 57 is also coated with the same kind of cementing agent as has been applied or is applied to the metal wheel surface, and this coating on the inside surface of the band is also allowed to dry.

The inside surface of the band, and the cement treated surface of the wheel are to be re-activated after they have been allowed to dry as previously explained, and immediately before applying the band to the wheel surface. For such reactivations the following operations may be used. The cement treated and dried wheel may be inserted into a bath of benzol or other suitable solvent and rotated on its axis several times immediately before insertion of such wheel into the holder 29 which has been brought to speed. This will re-activate the surface of the wheel. The band 57 may be dipped into a bath of benzol or other suitable solvent to re-activate the cementing agent which has previously been dried on said band's surface; or alternatively, said band may be set onto the holder 53 which is then set down over the sleeve 51 and onto the floor of the holder 29 which is at speed, thus bringing said band to speed and expanding it against the inner wall of the holder 29. Then the holder 53 may be removed, exposing the inner surface of the band, which inner surface had been previously treated with cementing agent and dried, as already explained. Then said inner surface of the band may be sprayed with the benzol or other suitable solvent instead of the dipping operation previously stated.

Having thus re-activated the cementing agent treated surfaces of both the wheel periphery and the band, and with the holder 53 removed from the holder 29, and with said holder 29 still at speed to retain the band against the inner surface of the holder 29, the wheel may be set down onto the floor of the holder 29, thus bringing said wheel quickly up to speed equal to the speed of the band. Then the power may be shut off from the motor 40, leaving said motor still connected to the shaft 30 by the belt so that the motor will act as a drag on the holder 29, the wheel set therein, and the band. Thus the speed of the holder will quickly drop sufficiently to allow the centrifugal force developed on the band to fall below that required to keep the band in expanded condition, and allowing the band to set inwardly against the wheel surface. The speed of the holder 29 will drop as thus explained in a few seconds, say 15–20 seconds to the required degree, and without the need of providing a special brake for that operation. The wheel carrying the band on its surface may then be removed from the holder 29 by use of the sleeve gripping portion 55. After removal of the so-banded wheel, said band may, if need be, be vulcanized or otherwise finally treated. Its edges may also be trimmed as shown at 60 in Figure 6. If desired the outer exposed surface of such band may also be ground to an accurately finished condition for better running of the tape or belt thereon.

If desired the band may be set onto an arbor of proper size and ground to accurately calibrated thickness prior to the various operations above explained, so as to ensure that the thickness of such band when applied to the wheel surface shall be uniform at all points.

I claim:

1. A wheel comprising in combination a cylindrical hub member, a body member comprising a pair of substantially identical circular sheet metal body elements each comprising an integral sheet metal blank of form to provide a slightly conical peripheral flange portion of wheel peripheral size and having one end edge of wheel crown diameter and facing axially in one direction, an axially extending central hub neck portion of size to seat on to one end portion of the hub member aforesaid and having the axial outer end facing axially in the direction opposite to the aforesaid edge of the peripheral flange portion, and a slightly dished conical body portion extending radially between the ends of the hub neck portion and the peripheral flange portion, each of which ends is axially removed from the edge of the peripheral flange of its body portion, each semi-diameter of such body element being of generally Z-shaped radial cross-section, both of said body members being mounted with their hub neck portions seated on the opposite end portions of the cylindrical hub member respectively and with their axial outer ends facing away from each other and in substantial registry with the proximate ends of the cylindrical hub member, and the crown diameter end edges of the body members facing each other, both of said crown diameter end edges registering and substantially contacting each other around the wheel crown periphery, together with a ring shaped element seated against the annular inside surfaces of both of the peripheral flange portions adjacent to the crown diameter edges of said peripheral flange portions, said ring shaped element and both of the peripheral flange portions being connected to the cylindrical hub member and to the hub neck portions of said body members solely by the conical body flange portions of such body members, together with means to lock the hub neck portions of the body elements against separating movement from each other.

2. A wheel as defined in claim 1, wherein said means to lock the hub neck portions against separating movement from each other comprises a radial enlargement of each end of the cylindrical hub member, such radial enlargement radially overlying the proximate end of the hub neck portion adjacent to such radial enlargement.

3. A wheel as defined in claim 2, wherein such radial enlargements comprise metal forming outward radial displacements of portions of the ends of the cylindrical hub member.

4. A wheel as defined in claim 1, together with a surfacing of elastic material of substantially uniform thickness overlying and secured to the exterior surface of the conical peripheral flange portion of the wheel.

References Cited in the file of this patent

UNITED STATES PATENTS

| | | |
|---|---|---|
| 788,185 | Bowen | April 25, 1905 |
| 1,152,597 | Bowers | Sept. 7, 1915 |
| 1,161,291 | Danielson | Nov. 23, 1915 |
| 1,628,220 | Berg | May 10, 1927 |
| 1,645,552 | Tannewitz | Oct. 18, 1927 |
| 1,803,357 | Robins | May 5, 1931 |
| 1,811,916 | Carter | June 30, 1931 |
| 1,838,164 | Tannewitz | Dec. 29, 1931 |
| 2,263,690 | Bradley | Nov. 25, 1941 |
| 2,422,065 | Anselmi | June 10, 1947 |
| 2,432,701 | Van Orden | Dec. 16, 1947 |